United States Patent [19]
Tomita et al.

[11] Patent Number: 5,567,485
[45] Date of Patent: Oct. 22, 1996

[54] MOLDING COMPOSITE COMPOSITION AND METHOD FOR MOLDING THE SAME

[75] Inventors: Takashi Tomita, Hiroshima; Masakatsu Ohsugi, Hiroshima-ken; Daisaburou Adachi, Hiroshima, all of Japan

[73] Assignee: Mazda Motor Corporation, Hiroshima-ken, Japan

[21] Appl. No.: 266,899

[22] Filed: Jul. 1, 1994

Related U.S. Application Data

[63] Continuation of Ser. No. 63,099, Apr. 15, 1993, abandoned.

[30] Foreign Application Priority Data

Apr. 17, 1992 [JP] Japan .................... 4-098193

[51] Int. Cl.$^6$ .................... C08L 67/00; C08L 67/04; C08L 77/00; C08L 77/12
[52] U.S. Cl. .................... 428/1; 156/244.12; 156/246; 252/299.01; 252/299.4; 252/299.5; 264/171.23; 264/174.1; 428/294
[58] Field of Search .................... 428/294, 1, 913; 156/244.12, 246; 264/177.2, 171, 174; 252/299.01, 299.4, 295.5

[56] References Cited

U.S. PATENT DOCUMENTS

| | | | |
|---|---|---|---|
| 4,968,555 | 11/1990 | Landler | 428/294 |
| 5,006,402 | 4/1991 | Isayev | 428/294 |
| 5,006,403 | 4/1991 | Isayev | 428/294 |
| 5,019,439 | 5/1991 | Momose | 428/294 |
| 5,275,877 | 1/1994 | Isayev | 428/294 |
| 5,283,114 | 2/1994 | Isayev | 428/294 |

FOREIGN PATENT DOCUMENTS

| | | |
|---|---|---|
| 0169947A1 | 2/1986 | European Pat. Off. . |
| 0217563 | 4/1987 | European Pat. Off. . |
| 0406979A1 | 1/1991 | European Pat. Off. . |
| 0438128A2 | 7/1991 | European Pat. Off. . |
| 64-90255 | 4/1989 | Japan . |
| 89-345373 | 10/1989 | Japan . |
| 90-13421 | 11/1990 | WIPO . |
| 91-01879 | 2/1991 | WIPO . |
| WO92/18568 | 10/1992 | WIPO . |

OTHER PUBLICATIONS

Chemical Abstracts, vol. 113, No. 18, 29 Oct. 1990, Abstract No. 153824.

Chemical Abstracts, vol. 115, No. 12, 23 Sep. 1991, Abstract No. 115652.

English Language European Search Report, dated Mar. 7, 1995.

*Primary Examiner*—James C. Cannon
*Attorney, Agent, or Firm*—Fish & Richardson PC

[57] ABSTRACT

The present invention is to provide a resin composite composition containing a third component for improving the properties of the composite product, based on the knowledge that the composite function between the matrix resin and the liquid crystal is improved by addition of a compatible agent therebetween. Therefore, there is provided a thermoplastic composite composition comprising a thermoplastic matrix resin, a liquid crystal resin which has a liquid crystal transition temperature higher than a minimum temperature of the matrix resin is to be molded and an ability to be melt-extruded into a fiber in the matrix resin, characterized by further comprising a compatible agent for providing an improved bonding power with an interfacing surface between the matrix resin and the liquid crystal resin, within a range possible to prevent the liquid crystal resin into a fiber or fibers having an aspect ratio of less than 3.

6 Claims, 5 Drawing Sheets

MOLDING COMPOSITE COMPOSITION AND METHOD FOR MOLDING THE SAME

This application is a continuation of U.S. application Ser. No. 08/063,099, filed Apr. 15, 1993, now abandoned.

BACKGROUND OF THE INVENTION

1. Field of the Invention

The present invention relates to a molding composite composition and a method for molding the same.

2. Description of the Related Art

Recently, there have been proposed a liquid crystal resin composite for improving a tensile strength of a matrix resin by the liquid crystal resin fibers dispersed therein (see Japanese Patent Tokkaisho 64-90255). The liquid crystal resin composite is prepared by melt-extruding a mixture comprising a thermoplastic resin as a matrix resin mixed with a predetermined amount of the liquid crystal resin having a liquid crystal transition point higher than a minimum form-able temperature of the thermoplastic resin. The composite material comes into public attention as a substitute of the conventional fiber reinforced plastic (FRP) composite because the advantage of the composite material is easy to be recycled. Further, there has been found that a reinforcement property is changed according to a fiber formation degree of the liquid crystal resin and the more the fiber formation degree advances, the more the property improves. Therefore, it is proposed by us that the melt-extruding process of the mixture should be carried in a manner that the liquid crystal resin fibers result in being formed in the matrix resin with an aspect ratio of 3 or more (see FIG. 2) and the resulting composite is subjected to a drawing treatment.

SUMMARY OF THE INVENTION

The major object of the present invention is therefore to provide a resin composite composition containing a third component for improving the properties of the composite product in order to improve the properties by any other method than the above drawing method.

As a result of our sharp study, it has been found that the composite function between the matrix resin and the liquid crystal is improved by addition of a compatible agent therebetween. On the basis of the inventive view, the present invention has been completed.

Therefore, according to an aspect of the present invention, there is provided a thermoplastic composite composition comprising a thermoplastic matrix resin, a liquid crystal resin which has a liquid crystal transition temperature higher than a minimum temperature capable of molding the matrix resin and which content is in a range capable of being melt-extruded into a fiber in the matrix resin, further comprising a compatible agent for providing an improved bonding power with an interfacing surface between the matrix resin and the liquid crystal resin, which compounding ratio is in a range possible to prevent the liquid crystal resin into a fiber or fibers having an aspect ratio of less than 3.

The matrix resin may be selected from the group comprising ABS resin, polystyrene resin, polycarbonate resin, polyphenyleneoxide resin, polyolefin resin, polyester resin, polyarylate resin, polyamide resin and mixtures thereof.

On the other hand, the liquid crystal resin (hereinafter referred as to LCR) is not limited and may be selected from the thermoplastic resins having a liquid crystal transition temperature higher, preferably by 20° C. or more, than the minimum moldable temperature of the matrix resin. Examples may include a thermoplastic liquid crystal polyester and a thermoplastic liquid crystal polyesteramide. Among them, the liquid crystal resins of Trade name VECTRA, ECONOL, ZAIDA, etc. are commercially available.

The fiber formable range of LCR is dependent on the kind and nature of the matrix resin as shown in FIG. 1. For example, in the case of using a polyamide resin as the matrix resin, preferably from 40 to 80 weight % based on the weight of the composite; in the case of ABS(Acrylonitrile-butandiene-styrene copolymer) resin, preferably from 30 to 75 weight %; in the case of PC(polycarbonate)/ABS resin, preferably from 3 to 70 weight %; in the case of PC/PBT resin, preferably from 2 to 60 weight %, in the case of PPO (polyphenyleneoxide)/PA6 (nylon), preferably from 3 to 65 weight %; in the case of the modified PPO resin, preferably from 3 to 60 weight %, in the case of polypropylene, preferably from 2 to 70 weight %; in the case of polycarbonate, preferably from 3 to 70 weight %; and in the case of PBT resin, preferably from 10 to 70 weight %.

On the other hand, the compatible agent may be selected depending on the kind and nature of the matrix resin. In the case of using ABS resin, polystyrene resin, polycarbonate resin or polyphenyleneoxide resin as the matrix resin, the compatible agent is preferably selected from modified matrix resin by a compound having an epoxy group and/or an acid anhydride, which examples includes EGMA-g-PS, EGMA-g-AS, an acid anhydride modified polystyrene, N-substituted maleimide copolymer. In the case of polyolefin resin, the compatible agent is also preferably selected from modified matrix resin by a compound having an epoxy group and/or an acid anhydride, which examples includes EGMA, EGMA-g-olefin. Further, in the case of polyester resin or polyarylate resin, the compatible agent may be preferably selected from the group comprising compounds having more than 2 of epoxy group, carboxyl group, oxazolynyl group or hydroxyl group, such as an acid anhydride modified polyolefin, EGMA, epoxy resin, an acid anhydride polyester, phenoxy resin and so on. Furthermore, in the case of a polyamide resin, the compatible agent is selected from the group comprising compounds having more than 2 of epoxy group, carboxyl group, oxazolynyl group or amino group such as EGMA, epoxy resin and an acid anhydride modified polyester.

Preferred combination examples are as follows:

| Matrix resin | Compatible agent |
| --- | --- |
| *PP(polypropylene) (SUMITOMO NOBLEN D501) (ADMER QB540) | Epoxy group contained Vinyl Copolymer (BLENMER CP-30) Ethylene-glucyzylmetacrylate Copolymer (BONDFIRST E) |
| *PC/ABS (TECHNIACE T105) | Ethylene-glycyzylmetacrylate-Acrylnitrile-Styrene Copolymer (MODIPER A4400) |
| *ABS | BLENMER CP-30 MODIPER A4400 |
| *PA/PPE | Epoxy resin (EPICLONE 7050) Ethylene-glycyzylmetacrylate-Styrene Copolymer (MODIPER A4100) |
| *PC | MODIPER A4400 |
| *PC/PBT | EPICLONE 7050 BONDFIRST E |
| *PBT | same as in the case of PC/PBT |

The compounding ratio of the compatible agent to be added is changed depending on the kind and nature of the matrix resin and the liquid crystal resin. As shown in FIG. 3, the more the compatible agent is added, the more the bonding power on the interfacing surface between the matrix resin and the LCR fiber increases and results in the increased tensile strength caused by the composite function. On the contrary, at the same time, the more the compatible agent is added, the more the surface tension on the interfacing surface between the matrix resin and the LCR fiber decreases and results in the lowered cohesion power of the LCR when melt-extruded because of dispersion stabilization of the LCR in the matrix resin and thus it is difficult to form the LCR into fibers. Therefore, the compatible agent to be added should be limited to the compounding ratio range that can prevent the LCR fibers from having an aspect ratio of 3 or less when melt-extruded, preferably to an amount range that generate a synergetic effect caused by the compatible effect and the fiber forming reinforcement effect.

The resin composite composition comprising the thermoplastic matrix resin, the liquid crystal resin having the liquid crystal transition higher than the minimum moldable temperature of the matrix resin and the compatible agent, should be melt-extruded by such a shear rate to form the LCR into the fibers of 3 or more. The shear rate may be from $3 \times 10^2$ to $10^5$ $sec^{-1}$.

The compatible agent may be added on the interfacing surface between the matrix resin and the LCR fibers in a following manner.

1) The LCR and the the compatible agent are preformed in a suitable shaped material, which is melt-mixed to the matrix resin or the composite material comprising the matrix resin and the LCR.

2) The matrix resin and the compatible agent are preformed in a suitable shaped material, which is melt-mixed to the LCR or the composite material comprising the matrix resin and the LCR.

Therefore, according to a second aspect of the present invention, there is provided a method for preparing the liquid crystal resin composite material for molding, which comprises;

a step for mixing a LCR composite comprising the matrix resin and the LCR with the compatible agent, or mixing the matrix resin or the LCR composite with a composite comprising the LCR and the compatible agent or a composite comprising the matrix resin and the compatible agent wherein the compounding ratio of the compatible agent is in a range possible to prevent the liquid crystal resin into a fiber or fibers having an aspect ratio of less than 3;

a step for extruding the mixture at a melting temperature above the liquid crystal transition point by the apparent resin shear rate of $3 \times 10^2$ to $10^5$ $sec^{-1}$ to give a molding composite material having the LCR fibers having an aspect of 3 or more.

Further, the resulting strands may be subjected to the drawing treatment after cooling or continuously without cooling after extruding. In this case, the drawing ratio (cross sectional area before drawing/that after drawing) is preferably from 11 to 120. Thereafter, the strands are cut into a predetermined length and used as a molding material.

According to the present invention, the compatible agent which is present at the interface between the matrix resin and the LCR, make the bonding power therebetween increased, which results in the increased composite function while maintaining the aspect of 3 or more. Therefore, according to the present invention, only the extruding formation is possible to give a sufficient fiber reinforcement to the LCR composite product. That is, while the composite function caused by use of only the matrix resin and the LCR can not give the sufficient reinforcement because the LCR fibers are damaged or destroyed on molding, which results in lowering the tensile strength after molding. The molding composite material prepared according to the present invention has a good productability such that the tensile strength is not lowered by the molding, so that the molding composite material according to the present invention is possible to give a product having a superior property than that of the conventional products.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

[EXAMPLE 1]

40 weight parts of PA6 (UBE NYLON1030B made by UBE INDUSTRIES,LTD) as the matrix resin, 60 weight parts of aromatic polyester (VECTRA made by POLYPLASTICS Co. Ltd.) as the LCR are mixed with the epoxy resin (EPICHLONE 7050 made by DAINIPPON INK CHEMICAL INDUSTRY Co., Ltd.) in the compounding ratio as shown in TABLE 1 and then extruded with drawing by means of a twin screw extruder (made by PLASTIC TECHNOLOGY Co., Ltd.) at the following conditions; screw diameter 30 mm, resin temperature 290° C., screw rotation number 75 rpm., die diameter 2 mm, shear rate 1700 $sec^{-1}$. The resulting composite strand of 1.4 mm diameter is cut into 3 mm in length to obtain pellets.

Next, the pellets are subjected to an injection molding process by means of Injection Molding Machine (220 ton made by TOSHIBA MACHINE Co., Ltd.) and a die mold for test piece at the molding condition; resin temperature 250° C., injection pressure 1000 $kg/cm^2$.

The molded products is subjected to a measuring of the tensile strength which is shown in TABLE 1. Comparing the data with that of the original strand, no lowering of the tensile strength is found.

Figure 1:
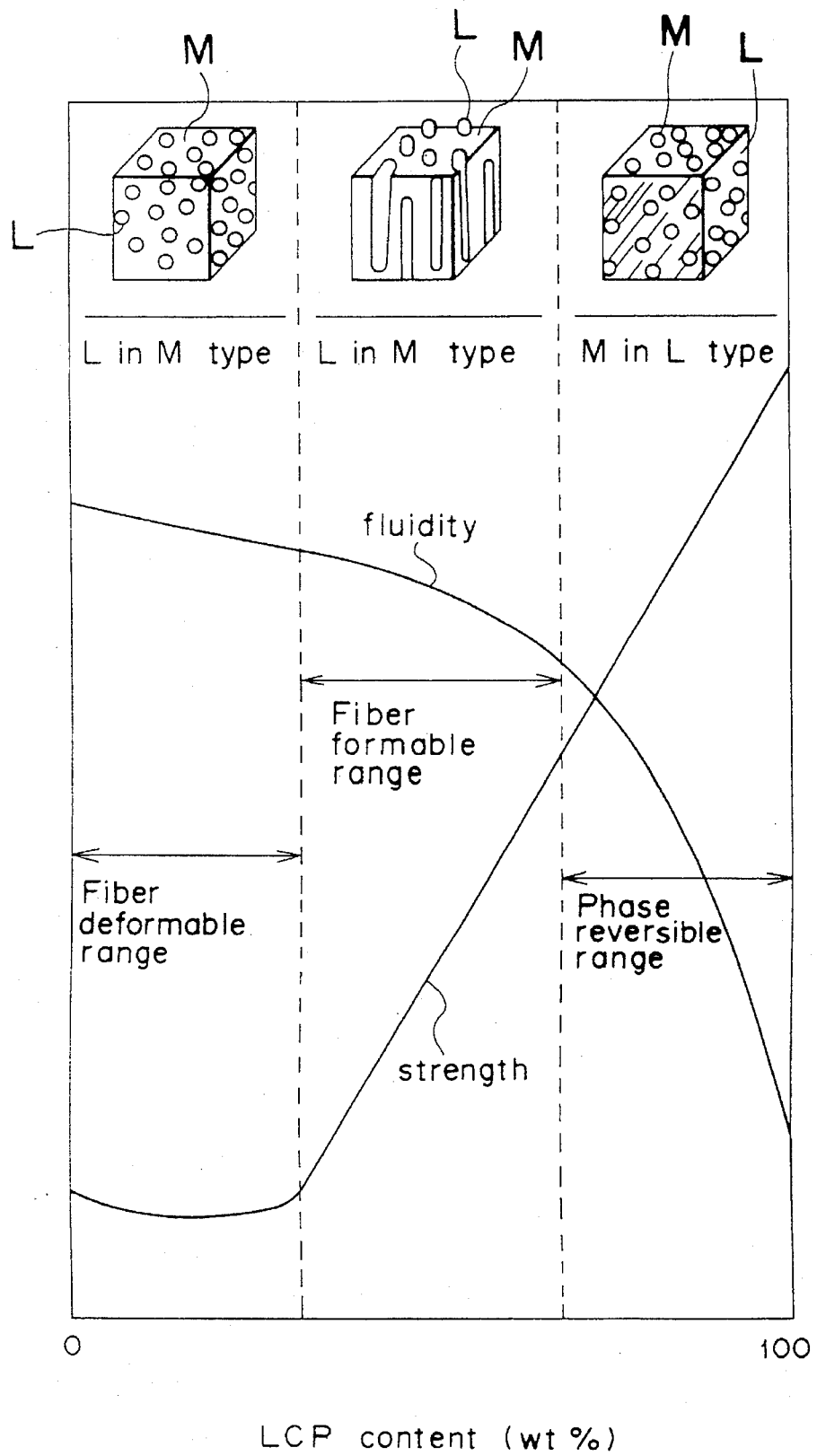
FIG. 1 is a graph showing an effect of the content of the LCR on the state variation of the composite material.
Figure 2:
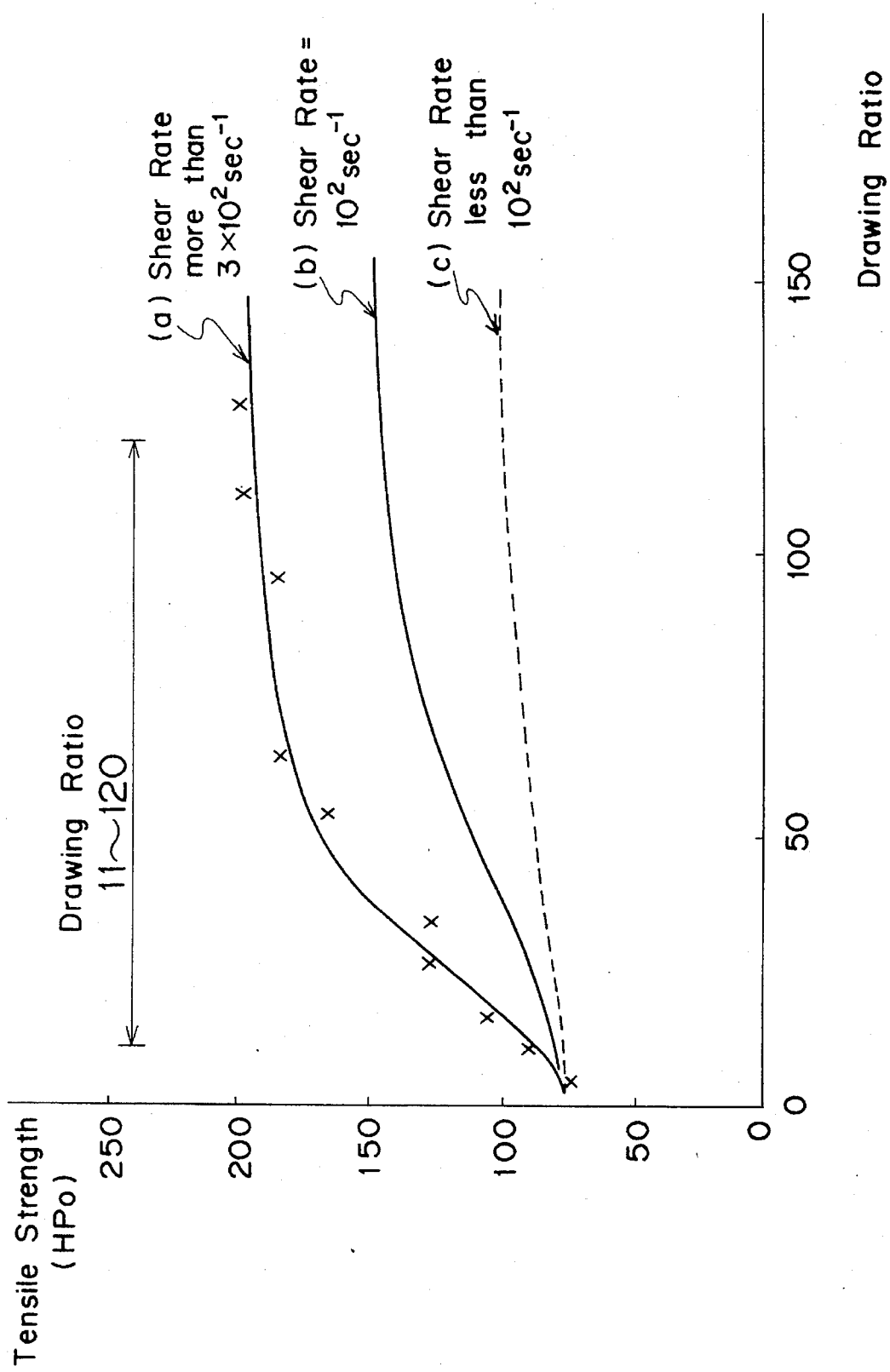
FIG. 2 is a graph showing an interaction between the apparent shear rate and the drawing ratio in the respect of the tensile strength.
Figure 3:
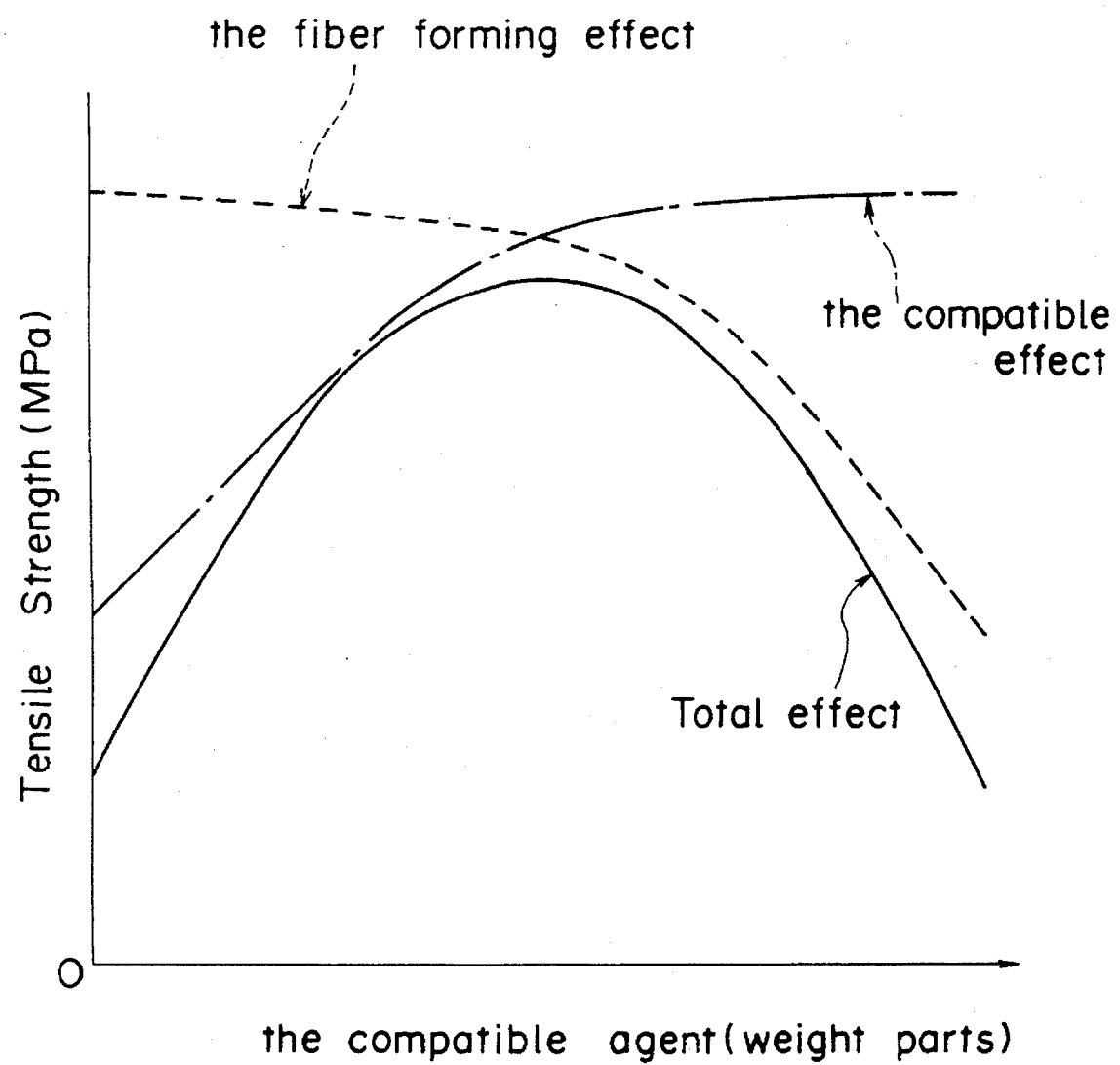
FIG. 3 is a graph showing an interaction between the compatible function and the fiber-forming function in the respect of the reinforcement effect.
Figure 4:
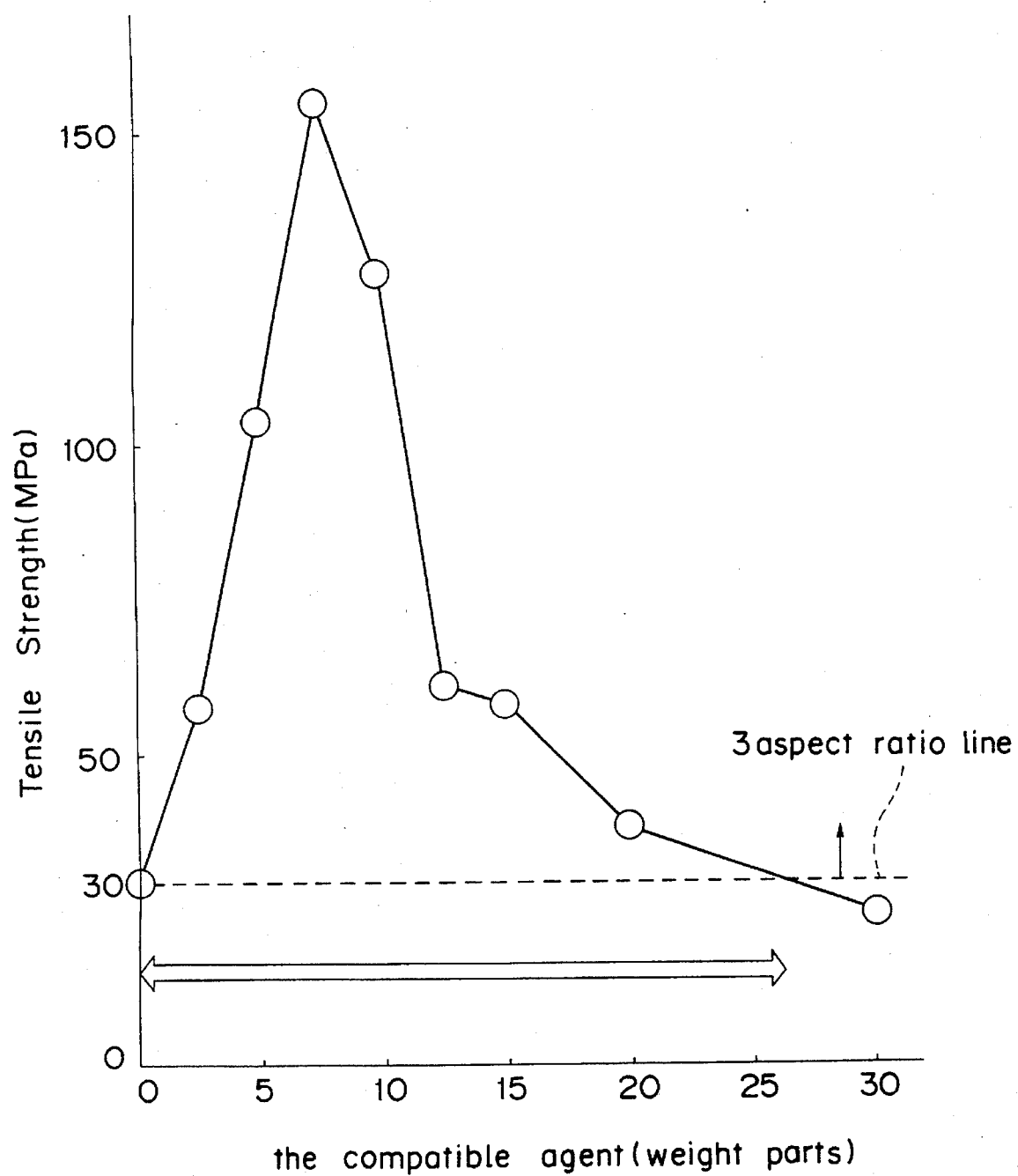
FIG. 4 is a graph showing a relation between the compounding ratio of the compatible agent and the tensile strength in the Example 1.

FIG. 4 is a graphic representation of the relationship between the compounding ratio of the compatible agent and the resultant tensile strength plotting the values set forth in TABLE 1, below.

TABLE 1

| Compounding ratio of the compatible agent (weight parts) | 0 | 2.5 | 5 | 7.5 | 10 | 12.5 | 15 | 20 | 30 | 40 |
|---|---|---|---|---|---|---|---|---|---|---|
| Tensile Strength (MPa) | 30 | 57 | 104 | 155 | 128 | | 61 | 58 | 39 | 25 | 18 |

[EXAMPLE 2]

80 weight parts of aromatic polyester (VECTRA A950 made by POLYPLASTICS Co. Ltd.) as the LCR and 20 weight parts of ethylene-glycyzylmethacrylate-styrene copolymer (MODIPER A4100 made by NIHON YUSHI Co., Ltd.) as the third componet are mixed and extruded with drawing by means of a twin screw extruder (made by PLASTIC TECHNOLOGY Co., Ltd.) at the following conditions; screw diameter 30 mm, resin temperature 290° C., screw rotation number 75 rpm., die diameter 2 mm, shear rate 1700 sec$^{-1}$. The resulting composite strand of 1 mm diameter is cut into 3 mm in length to obtain pellets.

60 weight parts of PA6 (UBE NYLON1030B made by UBE INDUSTRIES,LTD) as the matrix resin, 40 weight parts of aromatic polyester (VECTRA A950 made by POLYPLASTICS Co. Ltd.) as the LCR are mixed with the pellets prepared above as the third component in the compounding ratio as shown in TABLE 2 and then extruded with drawing by means of a twin screw extruder (made by PLASTIC TECHNOLOGY Co., Ltd.) at the following conditions; screw diameter 30 mm, resin temperature 290° C., screw rotation number 75 rpm., die diameter 2 mm, shear rate 1700 sec$^{-1}$. The resulting composite strand of 1.4 mm diameter is cut into 3 mm in length to obtain pellets.

Next, the pellets are subjected to an injection molding process by means of Injection Molding Machine (220 ton made by TOSHIBA MACHINE Co., Ltd.) and a die mold for test piece at the molding condition; resin temperature 240° C., injection pressure 1000 kg/cm$^2$.

The molded products is subjected to a measuring of the tensile strength which is shown in TABLE 2. Comparing the data with that of the original strand, no lowering of the tensile strength is found.

Figure 5:
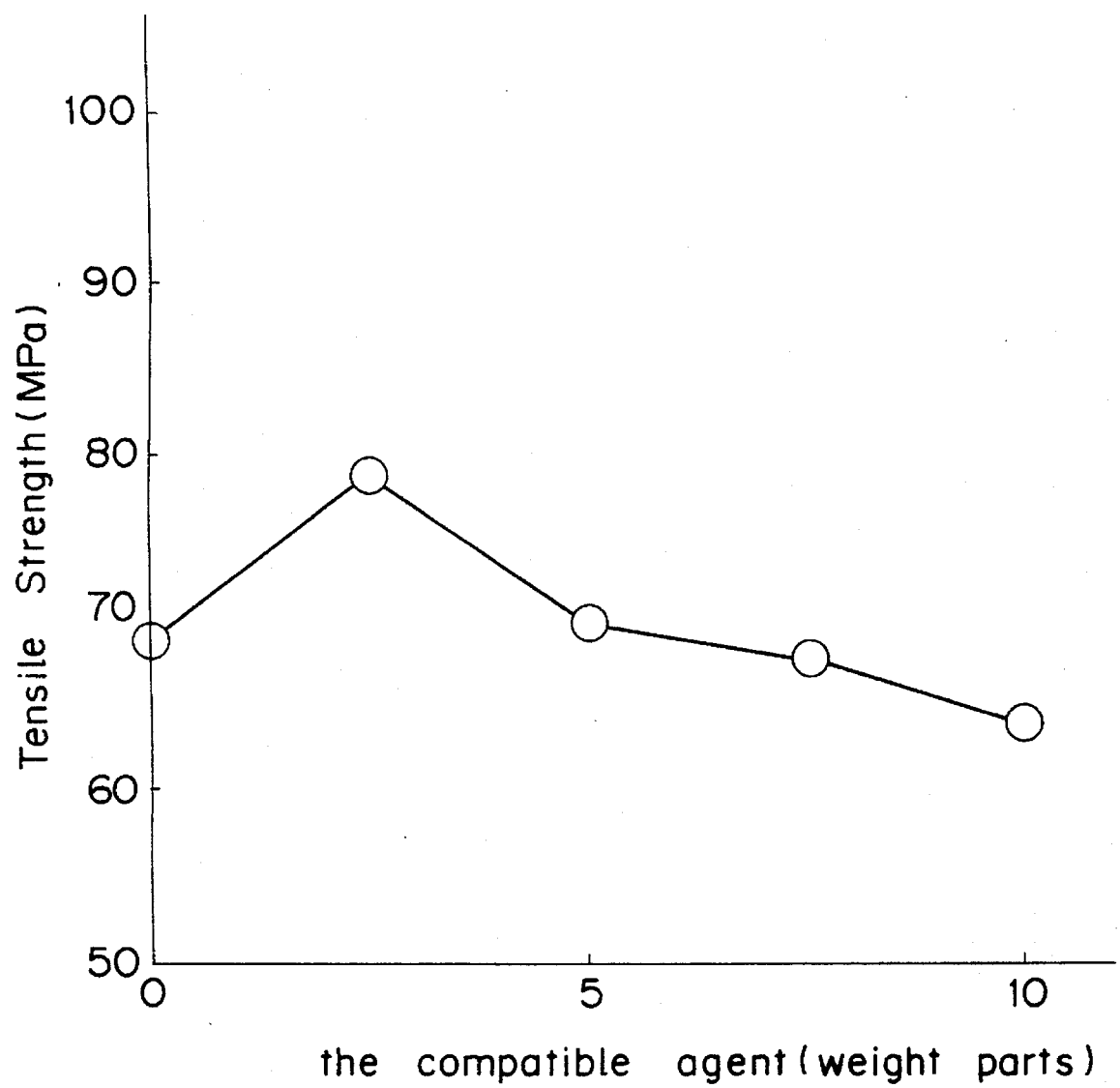
FIG. 5 is a graph showing a relation between the compounding ratio of the compatible agent and the tensile strength in the Example 2.

FIG. 5 is a graphic representation of the relationship between the compounding ratio of the compatible agent and the resultant tensile strength plotting the values set forth in TABLE 2, below.

TABLE 2

| Compounding ratio of the compatible agent (weight parts) | 0 | 2.5 | 5 | 7.5 | 10 |
|---|---|---|---|---|---|
| Tensile Strength (MPa) | 69 | 79 | 70 | 68 | 64 |

[EXAMPLE 3]

60 weight parts of PC/ABS (TECHNIACE T105 made by SUMITOMO DOW LTD. ) as the matrix resin and 40 weight parts of aromatic polyester (VECTRA made by POLYPLASTICS Co. Ltd. ) as the LCR are mixed with ethylene-glycyzylmetacrylate-acrylonitrile-styrene copolymer (MODIPER A4400 made by NIHOM YUSHI Co., Ltd.) in the compounding ratio as shown in TABLE 3 and then extruded with drawing by means of a twin screw extruder (made by PLASTIC TECHNOLOGY Co., Ltd.) at the following conditions; screw diameter 30 mm, resin temperature 290° C., screw rotation number 100 rpm., die diameter 2 mm, shear rate 1700 sec$^{-1}$. The resulting composite strand of 1.4 mm diameter is cut into 3 mm in length to obtain pellets.

Next, the pellets are subjected to an injection molding process by means of Injection Molding Machine (220 ton made by TOSHIBA MACHINE Co., Ltd.) and a die mold for test piece at the molding condition; resin temperature 250° C., injection pressure 1000 kg/cm$^2$.

The molded products is subjected to a measuring of the tensile strength which is shown in TABLE 3. Comparing the data with that of the original strand, no lowering of the tensile strength is found.

TABLE 3

| Compounding ratio of the compatible agent (weight parts) | 0 | 5 | 10 | 20 | 40 |
|---|---|---|---|---|---|
| Tensile Strength (MPa) | 63 | 81 | 84 | 69 | 46 |

[EXAMPLE 4]

70 weight parts of PP (SUMITOMO NOBLEN D501T made by SUMITOMO CHEMICAL Co., Ltd.) as the matrix resin and 30 weight parts of aromatic polyester (VECTRA made by POLYPLASTICS Co. Ltd.) as the LCR are mixed with epoxy group contained vinyl copolymer (BLENMER CP-30 made by NIHOM YUSHI Co., Ltd.) in the compounding ratio as shown in TABLE 4 and then extruded with drawing by means of a twin screw extruder (made by PLASTIC TECHNOLOGY Co., Ltd.) at the following conditions; screw diameter 30 mm, resin temperature 290° C., screw rotation number 150 rpm., die diameter 2 mm, shear rate 2500 sec$^{-1}$. The resulting composite strand of 1.4 mm diameter is cut into 3 mm in length to obtain pellets.

Next, the pellets are subjected to an injection molding process by means of Injection Molding Machine (220 ton made by TOSHIBA MACHINE Co., Ltd.) and a die mold for test piece at the molding condition; resin temperature 240° C., injection pressure 1000 kg/cm$^2$.

The molded products is subjected to a measuring of the tensile strength which is shown in TABLE 3. Comparing the data with that of the strand, no lowering of the tensile strength is found.

TABLE 4

| Compounding ratio of the compatible agent (weight parts) | 0 | 2.5 | 5 | 10 |
|---|---|---|---|---|
| Tensile Strength (MPa) | 28 | 31 | 28 | 25 |

[EXAMPLE 5]

60 weight parts of ABS(KRALASTIC MH made by SUMITOMO DOW Ltd.) as the matrix resin and 40 weight parts of aromatic polyester (VECTRA made by POLYPLASTICS Co. Ltd.) as the LCR are mixed with ethylene-glycyzylmetacrylate-acrylonitrile-styrene copolymer (MODIPER A4400 made by NIHON YUSHI Co., Ltd.) in the compounding ratio as shown in TABLE 5 and then extruded with drawing by means of a twin screw extruder (made by PLASTIC TECHNOLOGY Co., Ltd.) at the following conditions; screw diameter 30 mm, resin temperature 290° C., screw rotation number 150 rpm., die diameter 2 mm, shear rate 2500 sec$^{-1}$. The resulting composite strand of 1.4 mm diameter is cut into 3 mm in length to obtain pellets.

Next, the pellets are subjected to an injection molding process by means of Injection Molding Machine (220 ton made by TOSHIBA MACHINE Co., Ltd.) and a die mold for test piece at the molding condition; resin temperature 240° C., injection pressure 1000 kg/cm$^2$.

The molded products is subjected to a measuring of the tensile strength which is shown in TABLE 5. Comparing the data with that of the strand, no lowering of the tensile strength is found.

TABLE 5

| Compounding ratio of the compatible agent (weight parts) | 0 | 2.5 | 5 | 10 | 20 | 40 |
|---|---|---|---|---|---|---|
| Tensile Strength (MPa) | 33 | 33 | 37 | 39 | 40 | 37 |

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A thermoplastic composite composition, comprising:
   a thermoplastic matrix resin,
   a liquid crystal resin which has a liquid crystal transition temperature higher than a minimum molding temperature of said matrix resin and which is capable of being melt-extruded into a fiber in the matrix resin; and
   a compatible agent for providing an improved bonding power with an interfacing surface between the matrix resin and the liquid crystal resin, said compatible agent having a compounding ratio sufficient to prevent the liquid crystal resin fiber or fibers formed by extruding said thermoplastic composite composition from having an aspect ratio of less than 3;
   wherein the thermoplastic matrix resin is selected from the group consisting of ABS resin, polystyrene resin, polyphenyleneoxide resin, polycarbonate resin and polyolefin resin, with the provisos that:
   (i) where the thermoplastic matrix resin is an ABS resin, polystyrene resin, or polyphenyleneoxide resin, the compatible agent is a matrix resin modified by a compound having an epoxy group and/or an acid anhydride,
   (ii) where the matrix resin is a polycarbonate resin, the compatible agent is a matrix resin modified by an acid anhydride; and
   (iii) where the matrix resin is a polyolefin resin, the compatible agent is a matrix resin modified by a compound having an epoxy group.

2. A thermoplastic composite composition, comprising:
   a thermoplastic matrix resin;
   a liquid crystal resin having a liquid crystal transition temperature higher than a minimum molding temperature of said matrix resin, and which is capable of being melt-extruded into a fiber in the matrix; and
   a compatible agent for providing an improved bonding power with an interfacing surface between the matrix resin and the liquid crystal resin, said compatible agent having a compounding ratio sufficient to prevent the liquid crystal resin fiber formed by extruding said thermoplastic composite composition from having an aspect ratio of less than 3,
   wherein the matrix resin is selected from the group consisting of polyester resin and polyarylate resin, and the compatible agent is selected from the group consisting of compounds having more than two epoxy groups, carboxyl groups or oxazolynyl groups or hydroxyl groups.

3. A thermoplastic composite composition, comprising:
   a thermoplastic matrix resin;
   a liquid crystal resin having a liquid crystal transition temperature higher than a minimum molding temperature of said matrix resin, and which is capable of being melt-extruded into a fiber in the matrix; and
   a compatible agent for providing an improved bonding power with an interfacing surface between the matrix resin and the liquid crystal resin, said compatible agent having a compounding ratio sufficient to prevent the liquid crystal resin fiber formed by extruding said thermoplastic composite composition from having an aspect ratio of less than 3,
   wherein the matrix resin is a polyamide resin and the compatible agent is selected from the group consisting of compounds having more than two epoxy groups, carboxyl groups, oxazolynyl groups or amino groups.

4. The composite composition according to claim 3 wherein the compatible agent is selected from the group consisting of EGMA, epoxy resins, and an acid anhydride modified polyester.

5. A thermoplastic composite composition, comprising:
   a thermoplastic matrix resin;
   a liquid crystal resin having a liquid crystal transition temperature higher than a minimum molding temperature of said matrix resin, and which is capable of being melt-extruded into a fiber in the matrix; and
   a compatible agent for providing an improved bonding power with an interfacing surface between the matrix resin and the liquid crystal resin, said compatible agent having a compounding ratio sufficient to prevent the liquid crystal resin fiber formed by extruding said thermoplastic composite composition from having an aspect ratio of less than 3,
   wherein the matrix resin is a polyamide resin and the compatible agent is an epoxy resin.

6. A method for preparing a liquid crystal resin composite material for molding, the method comprising the steps of:
   combining a liquid crystal resin, a matrix resin and a compatible agent, wherein said compatible agent has a compounding ratio sufficient to prevent the liquid crystal resin fiber or fibers formed in the following extruding step from having an aspect ratio of less than 3; and
   extruding the mixture at a melting temperature above the liquid crystal transition point by the apparent resin shear rate of $3 \times 10^2$ to $10^5$ sec$^{-1}$ to give a molding composite material having the LCR fibers having an aspect ratio of 3 or more.

* * * * *